(12) United States Patent
Tai et al.

(10) Patent No.: US 7,886,724 B2
(45) Date of Patent: Feb. 15, 2011

(54) CHARGE AIR COOLER ARRANGEMENT WITH COOLER BYPASS AND METHOD

(75) Inventors: Chun Tai, Hagerstown, MD (US); Todd Colin Reppert, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 272 days.

(21) Appl. No.: 12/279,545

(22) PCT Filed: Feb. 23, 2006

(86) PCT No.: PCT/US2006/006245
§ 371 (c)(1),
(2), (4) Date: Aug. 15, 2008

(87) PCT Pub. No.: WO2007/097750

PCT Pub. Date: Aug. 30, 2007

(65) Prior Publication Data

US 2009/0050117 A1 Feb. 26, 2009

(51) Int. Cl.
*F02M 15/00* (2006.01)
*F02M 25/07* (2006.01)
(52) U.S. Cl. .................. 123/542; 123/568.12
(58) Field of Classification Search ........... 123/568.12, 123/542, 316, 559.1, 562, 563; 60/599
See application file for complete search history.

(56) References Cited

U.S. PATENT DOCUMENTS

| 4,062,188 A * | 12/1977 | Cutler et al. ................. 60/599 |
| 6,510,690 B2 * | 1/2003 | Furukawa et al. ............ 60/599 |
| 2001/0023588 A1 * | 9/2001 | Furukawa et al. ............ 60/599 |
| 2003/0098011 A1 | 5/2003 | Natkin et al. |
| 2004/0040548 A1 | 3/2004 | Reuss |
| 2006/0086089 A1 * | 4/2006 | Ge .............................. 60/599 |
| 2008/0034752 A1 * | 2/2008 | Becker et al. ................ 60/599 |

FOREIGN PATENT DOCUMENTS

GB         2055963 A   *   3/1981

OTHER PUBLICATIONS

International Search Report for corresponding International Application PCT/US2006/006245.

* cited by examiner

*Primary Examiner*—Mahmoud Gimie
(74) *Attorney, Agent, or Firm*—WRB-IP LLP

(57) ABSTRACT

A charge air cooler arrangement includes a first charge air cooler disposed upstream of an engine inlet, a second cooler disposed upstream of the first charge air cooler, and a bypass line for bypassing the second cooler, a downstream end of the bypass line being disposed upstream of the first charge air cooler. A method of reducing condensation in an engine having charge air cooling is also disclosed.

20 Claims, 3 Drawing Sheets

CHARGE AIR COOLER ARRANGEMENT WITH COOLER BYPASS AND METHOD

The present invention relates to a charge air cooling arrangement and, more particularly, a charge air cooling arrangement with a cooler bypass line.

As seen in FIG. 1A, which shows a conventional internal combustion engine 1, turbochargers or superchargers 2 compress incoming air, causing it to become heated. Because hot air is less dense than cooler air at the same pressure, the total charge delivered to the cylinders is less than it could be. By cooling the charge after compression using devices such as charge air coolers (CAC) 4 or, in multi-stage turbocharging systems, intercoolers, even more charge can be delivered, increasing power. Additionally, devices such as CACs and intercoolers help to increase the total amount of boost allowable prior to the beginning of detonation in the cylinder by decreasing the temperature of the air charge.

Exhaust gas recirculation (EGR) is a NOx (nitrogen oxide and nitrogen dioxide) reduction technique used in most gasoline and diesel engines. EGR works by recirculating some percentage (e.g., 5-10%) of an engine's exhaust gas back to the engine cylinders. Intermixing the incoming air with recirculated exhaust gas dilutes the mix with inert gas which slows the combustion, and lowers the peak temperatures. Because NOx formation progresses much faster at high temperatures, EGR serves to limit the generation of NOx. NOx is primarily formed due to the presence of oxygen and high temperatures.

Recirculation of exhaust gas is usually achieved by piping a route 5 from the exhaust manifold 6 to the inlet manifold 7. A control valve 8 (EGR valve) within the circuit regulates and times the gas flow. In modern diesel engines, the EGR gas is typically cooled using a heat exchanger (EGR cooler) 9 to allow the introduction of a greater mass of recirculated gas.

When devices such as CACs 4 cool charge air to temperatures below the dew point of the charge air, the resulting condensation, particularly when mixed with exhaust gases, can be harmful to engine parts such as inlet valves and inlet valve seats. One prior solution includes shutting off EGR when temperature of charge air exiting the CAC falls below the dew point temperature. Because this solution increases NOx formation, it is not approved by the U.S. Environmental Protection Agency.

Another prior solution includes directing some of the charge air through a bypass 10. However, when only a portion of the charge air bypasses the CAC 4, even though the mixture of charge air that has bypassed the CAC and the charge air that has passed through the CAC may be at a temperature above the dew point as seen at point A in the graph of FIG. 1B, charge air that passes through the CAC can still be cooled to temperatures below the dew point as seen at point B. Thus, the CAC bypass 10 does not fully solve the problem of condensation.

According to an aspect of the present invention, an engine with a charge air cooler arrangement comprises an engine, an inlet leading to the engine, a first charge air cooler disposed upstream of the inlet, a second cooler disposed upstream of the first charge air cooler, and a bypass line for bypassing the second cooler upstream of the first charge air cooler.

According to another aspect of the present invention, a charge air cooler arrangement comprises a first charge air cooler disposed upstream of an engine inlet, a second cooler disposed upstream of the first charge air cooler, and a bypass line for bypassing the second cooler, a downstream end of the bypass line being disposed upstream of the first charge air cooler.

According to yet another aspect of the present invention, a method of reducing condensation in an engine having charge air cooling comprises causing inlet air to flow through a first charge air cooler downstream from a second cooler and a bypass line arranged for bypassing the second cooler, and adjusting inlet air temperature downstream of the first charge air cooler by adjusting an amount of inlet air flow through the second cooler and the bypass line.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
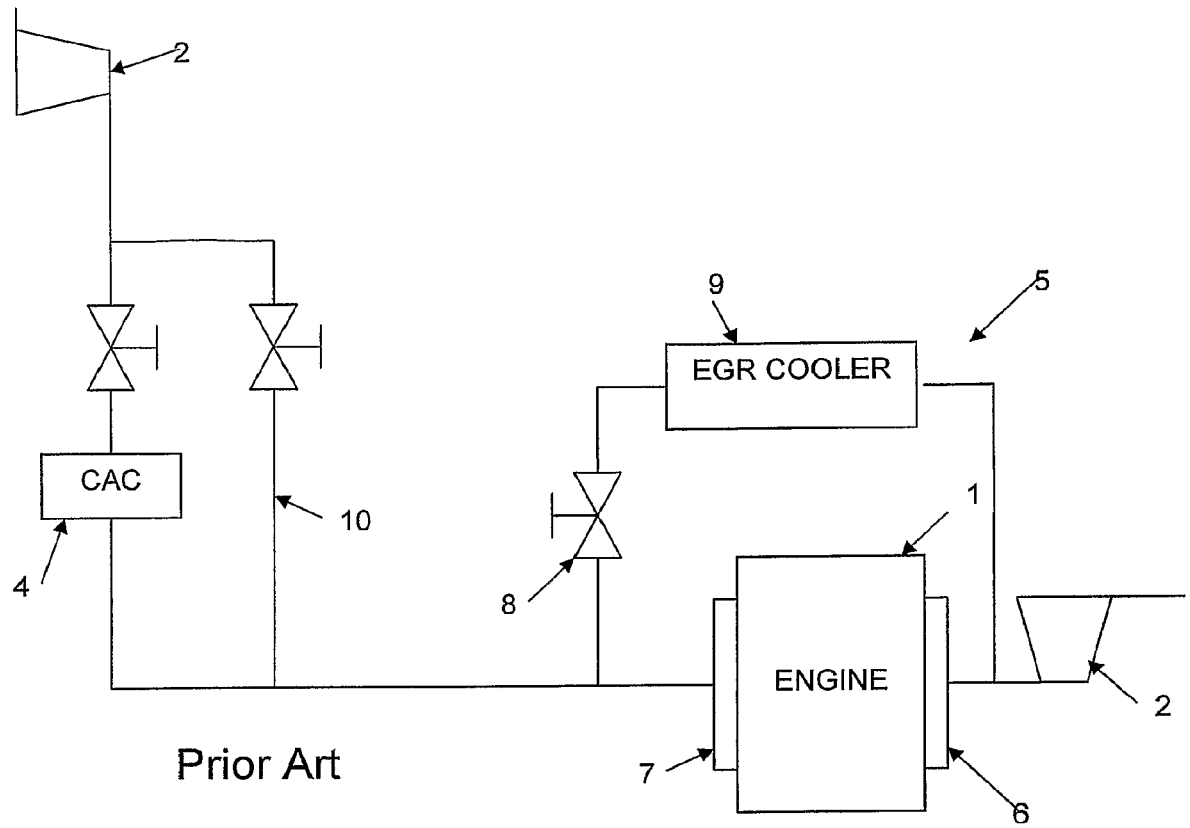
FIG. 1A schematically shows a prior art engine with CAC, CAC bypass and EGR.
Figure 1B:
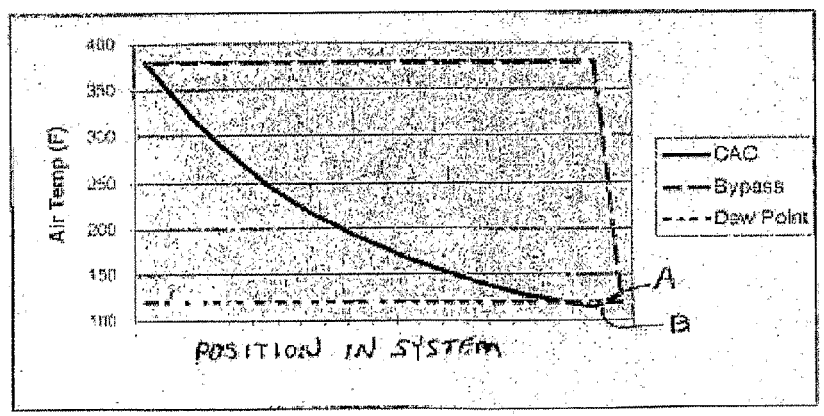
FIG. 1B is a graph of charge air temperature through a CAC and bypass of the type shown in FIG. 1A.
Figure 2A:
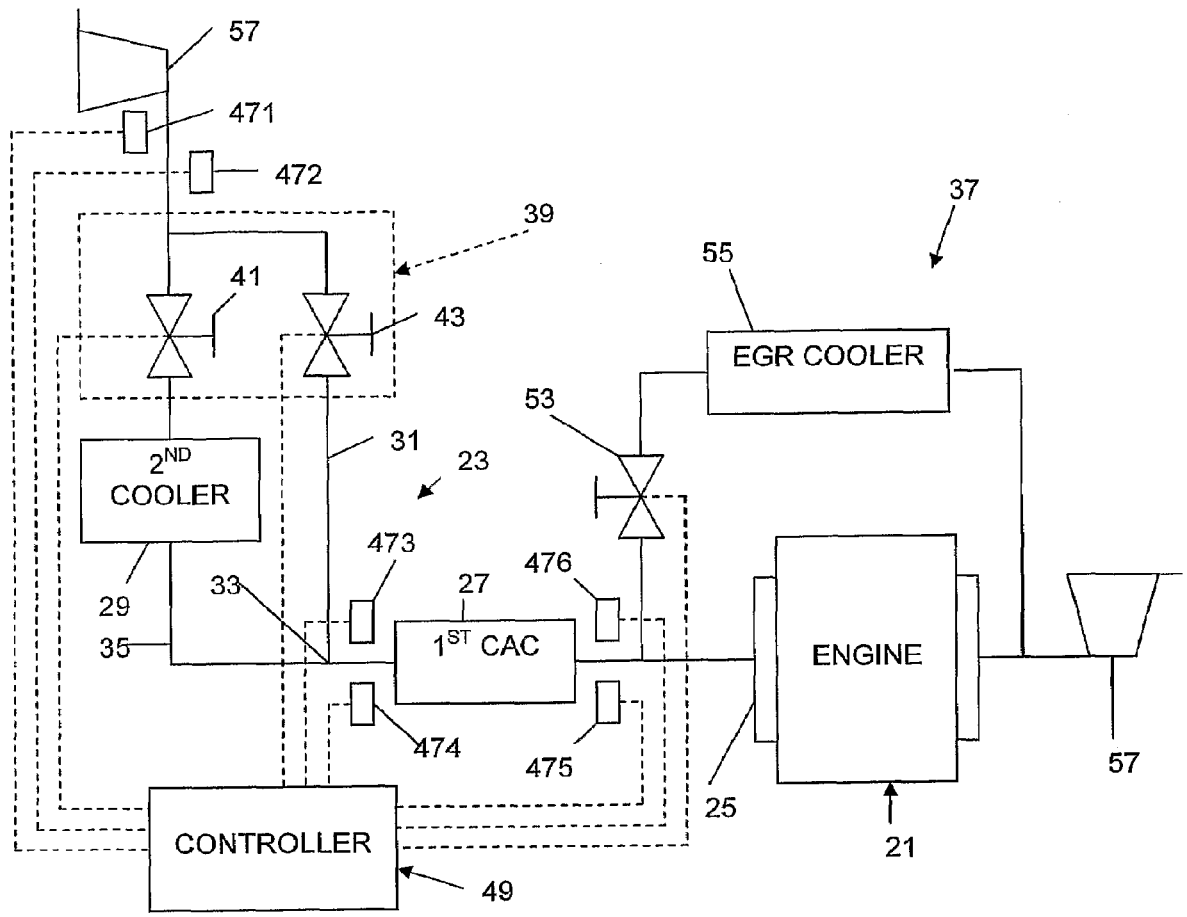
FIG. 2A schematically shows an engine with CAC according to an embodiment of the present invention.

An engine 21 with a charge air cooler arrangement 23 is seen in FIG. 2A. An inlet, typically an inlet manifold 25, leads to the engine 21. A first charge air cooler 27 (CAC) is disposed upstream of the inlet manifold 25. The first CAC 27 may be less efficient than CACs typically used with conventional internal combustion engines. More particularly, it is desirable that the first CAC 27 be insufficiently efficient to be able to cool air in the range of temperatures and relative humidity in which the engine 21 is expected to be operated to a temperature below the dew point for the air in or downstream of the first CAC. In other words, the first CAC 27 will not ordinarily be able to cause condensation downstream of the first CAC.

A second cooler 29 is disposed upstream of the first CAC 27. It is desirable that the second cooler 29 and the first CAC 27, operated in series, be capable of lowering the temperature of inlet air in the range of temperature and relative humidity in which the engine 21 is expected to be operated to temperatures substantially below the temperature at which the first CAC 27 is capable of lowering the temperature by itself. The first CAC 27 and the second cooler 29 operated in series may be capable of lowering inlet air temperatures to temperatures at or below the dew point of the inlet air.

A bypass line 31 is provided for bypassing the second cooler 29 upstream of the first CAC 27. A downstream end 33 of the bypass line 31 is in flow communication with a conduit 35 between the first CAC 27 and the second cooler 29. When inlet air flows through the bypass line 31, the first CAC 27 does not cool the air to temperatures as low as it might if all inlet air flowed through the second cooler 29.

An EGR circuit 37 can be in flow communication with the inlet manifold 25. It is desirable that inlet air temperatures downstream of the first CAC 27 be sufficiently high to avoid condensation as condensation, particularly together with EGR gases, tends to result in products harmful to engine parts such as inlet valves and valve seats. The temperature of the inlet air downstream of the first CAC 27 can be maintained at or above desired temperatures by shutting off flow through the second cooler 29 and directing all flow through the bypass line 31, or by appropriately balancing an amount of air that passes through the second cooler and an amount that flows through the bypass line.

Figure 2B:
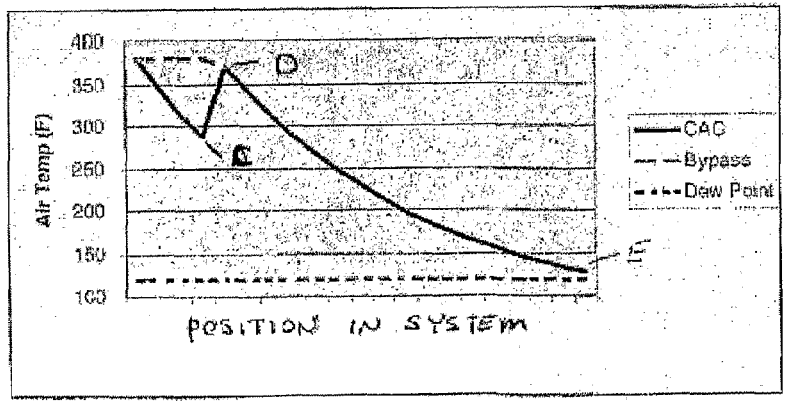
FIG. 2B is a graph of charge air temperature through a CAC and bypass of the type shown in FIG. 2A.

An appropriate balance of inlet air through the second cooler 29 and inlet air through the bypass line 31 may be achieved using a valve arrangement 39 adapted to adjust flow of inlet air through the second cooler and the bypass line. The valve arrangement 39 may be adapted to entirely shut off flow through the bypass line 31 and/or through the second cooler 29 or may be adapted to permit flow at desired levels through both the second cooler and the bypass line. FIG. 2A shows a valve arrangement comprising valves 41 and 43 for adjusting flow through the second cooler 29 and the bypass line 31, respectively. The valves 41 and 43 can have only open/closed modes or can be adjustable to various states between fully open or fully closed. Other valve arrangements will also ordinarily be available, such as a three-way valve for permitting flow to only one of the second cooler 29 and the bypass line 31. FIG. 2B is a graph showing that, as inlet air passes through the system, by passing some inlet air through the second cooler 29 so that it is cooled (exiting the second cooler at point C) and some inlet air through the bypass line 31 so that it is not cooled, when those two streams are combined (at point D) and then passed through the first CAC 27, the temperature of the resulting, cooled stream (point E) can be maintained above a dew point temperature.

A sensor arrangement comprising a sensor adapted to sense data pertaining to a dew point of inlet air and adapted to send a signal relating to the data to a controller 49 to control the valve arrangement 39 in response to the signal can be provided. Data pertaining to the dew point of inlet air will ordinarily comprise one or more of inlet air temperature and/or relative humidity upstream of the first CAC 27 and the second cooler 29, inlet air temperature and/or relative humidity upstream of the first CAC and downstream of the second cooler, and inlet air temperature and/or relative humidity downstream of the first CAC and the second cooler. Such data can be collected by temperature and/or relative humidity sensors 471 and 472 upstream of the first CAC 27 and the second cooler 29, respectively; temperature and/or relative humidity sensors 473 and 474 upstream of the first CAC and downstream of the second cooler, respectively; and temperature and/or relative humidity sensors 475 and 476 downstream of the first CAC and the second cooler, respectively. Thus, the sensor arrangement may comprise sensors such as temperature sensors (e.g., thermometers and temperature sensitive switches), humidity sensors or dew point sensors (such as hygrometers), and the like although, by listing the foregoing types of sensors, it is not intended to limit the types of equipment that can be used to determine or estimate a dew point of the inlet air.

The sensor arrangement may comprise a sensor in the form of a temperature sensor 475 adapted to monitor temperature downstream of the first CAC 27 and send a signal relating to the temperature to the controller 49 to control the valve arrangement 39 in response to the signal. The controller 49 can be arranged to adjust the valve arrangement 39 in response to signals that the temperature downstream of the first CAC 27 is below a dew point temperature of the inlet air so that flow through the second cooler 29 is reduced and flow through the bypass line 31 is increased. The signals may be based on measurements of other factors, such as pressure, relative humidity, and temperature upstream and downstream of the first CAC 27 and the second cooler 29 that can be used to calculate whether conditions for condensation exist downstream of the first CAC, or they may be based solely on measurement of a single parameter, e.g., temperature at some point (such as downstream of the first CAC) at which it is anticipated that under typical operating conditions there will often be condensation downstream of the first CAC. When monitored/sensed conditions are such that condensation downstream of the first CAC 27 is anticipated, the bypass 31 can be opened and/or the second cooler 29 can be closed so that conditions downstream of the first CAC 27 are unlikely to result in condensation.

The EGR circuit 37 will typically be in communication with the inlet 25. The EGR circuit 37 includes an EGR valve 53 responsive to a signal from the sensor arrangement to open and shut the EGR valve. The EGR valve 53 may, for example, be shut in response to a signal from the temperature sensor 475 downstream of the first CAC 27 reflecting conditions likely to result in condensation. The temperature sensor 475 can send a signal to the controller 49 which, in turn, sends a signal to the EGR valve. The EGR circuit 37 also includes an EGR cooler 55 and other components of conventional EGR systems and can be operated in substantially the same way as a conventional EGR system.

Figure 3:
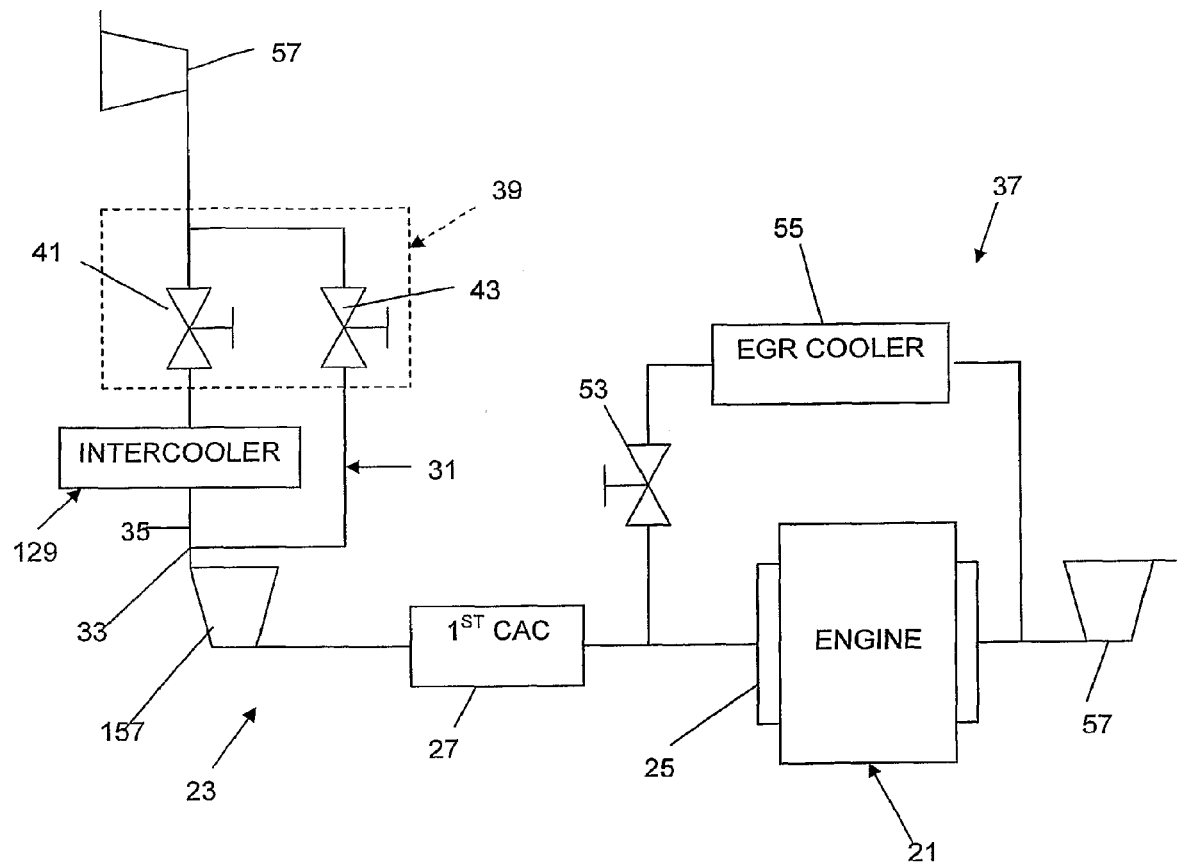
FIG. 3 schematically shows an engine with CAC according to another embodiment of the present invention.

The second cooler 29 can be a cooler of any suitable type. Typically, the second cooler will be a CAC downstream of a turbocharger 57 or supercharger as seen in FIG. 2A or, as seen in FIG. 3, the second cooler 129 can be, e.g., an intercooler downstream of a first turbocharger 57 and upstream of a second turbocharger 157 of a two-stage turbocharging system.

In a method of reducing condensation in an engine 21 having the charge air cooling arrangement 23, inlet air is caused to flow through the first CAC 27 downstream from the second cooler 29 and downstream from the bypass line 31 arranged for bypassing the second cooler. Inlet air temperature downstream of the first CAC 27 is adjusted by adjusting an amount of inlet air flow through the second cooler 29 and the bypass line 31. The amount of inlet air flow through the second cooler 29 and the bypass line 31 can be adjusted in any suitable fashion, such as by shutting one line and opening the other, or by partially opening or closing one or both lines so as to achieve a desired temperature downstream of the first CAC 27.

Typically, inlet air temperature will be monitored and the amount of inlet air flow through the second cooler 29 and the bypass line 31 will be adjusted as a function of inlet air temperature. For example, when a sensor such as the temperature sensor 475 determines that the temperature downstream of the first CAC 27 has dropped to a level near, at, or below a temperature at which condensation is expected to occur, the volume of flow through the second cooler 29 can be decreased and the volume of flow through the bypass can be increased. In addition to monitoring inlet air temperature downstream of the first CAC 27, inlet air temperature can be monitored upstream of the first CAC, such as by sensors 471 and/or 473. Further, parameters other than temperature may be monitored, and the amount of flow through the second cooler 29 and the bypass line 31 can be controlled as a function of those parameters alone or in combination with other parameters.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. An engine with a charge air cooler arrangement, comprising:
   an engine;
   an inlet leading to the engine;
   a first charge air cooler disposed upstream of the inlet;
   a second cooler disposed upstream of the first charge air cooler;
   a bypass line for bypassing the second cooler upstream of the first charge air cooler;
   a valve arrangement adapted to adjust flow of inlet air through the second cooler and the bypass line; and
   a sensor arrangement comprising a sensor adapted to sense data pertaining to a dew point of inlet air and send a signal relating to the data to a controller to control the valve arrangement in response to the signal,
   wherein the first charge air cooler is in series with the second cooler and the bypass line, and the second cooler is in parallel with the bypass line.

2. The engine with a charge air cooler arrangement as set forth in claim 1, comprising an EGR circuit in communication with the inlet.

3. The engine with a charge air cooler arrangement as set forth in claim 1, wherein the valve arrangement is adapted to shut off flow through the bypass line.

4. The engine with a charge air cooler arrangement as set forth in claim 3, wherein the valve arrangement is adapted to shut off flow through the second cooler.

5. The engine with a charge air cooler arrangement as set forth in claim 1, wherein the valve arrangement is adapted to shut off flow through the second cooler.

6. The engine with a charge air cooler arrangement as set forth in claim 1, wherein the valve arrangement is adapted to permit flow through both the second cooler and the bypass line.

7. The engine with a charge air cooler arrangement as set forth in claim 1, wherein the sensor arrangement comprises a temperature sensor adapted to monitor temperature downstream of the first charge air cooler and send a signal relating to the temperature to the controller to control the valve arrangement in response to the signal.

8. The engine with a charge air cooler arrangement as set forth in claim 7, wherein the controller is arranged to adjust the valve arrangement in response to signals that the temperature downstream of the first charge air cooler is below a dew point of the inlet air so that flow through the second cooler is reduced and flow through the bypass line is increased.

9. The engine with a charge air cooler arrangement as set forth in claim 1, comprising an EGR circuit in communication with the inlet, the EGR circuit including an EGR valve responsive to a signal from the sensor arrangement to open and shut the EGR valve.

10. The engine with a charge air cooler arrangement as set forth in claim 1, comprising a sensor arrangement comprising a temperature sensor adapted to monitor temperature downstream of the first charge air cooler and send a signal relating to the temperature to a controller to control the valve arrangement in response to the signal.

11. The engine with a charge air cooler arrangement as set forth in claim 1, wherein the second cooler is a charge air cooler.

12. The engine with a charge air cooler arrangement as set forth in claim 1, wherein the second cooler is an intercooler downstream of a first turbocharger and upstream of a second turbocharger of a two-stage turbocharging system.

13. A charge air cooler arrangement, comprising:
    a first charge air cooler disposed upstream of an engine inlet;
    a second cooler disposed upstream of the first charge air cooler;
    a bypass line for bypassing the second cooler, a downstream end of the bypass line being disposed upstream of the first charge air cooler;
    a valve arrangement adapted to adjust flow of inlet air through the second cooler and the bypass line; and
    a sensor arrangement comprising a sensor adapted to sense data pertaining to a dew point of inlet air and send a signal relating to the data to a controller to control the valve arrangement in response to the signal,
    wherein the first charge air cooler is in series with the second cooler and the bypass line, and the second cooler is in parallel with the bypass line.

14. The charge air cooler arrangement as set forth in claim 13, wherein the sensor arrangement comprises a temperature sensor adapted to monitor temperature downstream of the first charge air cooler and send a signal relating to the temperature to the controller to control the valve arrangement in response to the signal.

15. The charge air cooler arrangement as set forth in claim 14, wherein the controller is arranged to adjust the valve arrangement in response to signals that the temperature downstream of the first charge air cooler is below a dew point of the inlet air so that flow through the second cooler is reduced and flow through the bypass line is increased.

16. The charge air cooler arrangement as set forth in claim 13, comprising a sensor arrangement comprising a temperature sensor adapted to monitor temperature downstream of the first charge air cooler and send a signal relating to the temperature to a controller to control the valve arrangement in response to the signal.

17. A method of reducing condensation in an engine having charge air cooling, comprising:
    causing inlet air to flow through a first charge air cooler downstream from a second cooler and a bypass line arranged for bypassing the second cooler, the first charge air cooler being arranged in series with the second cooler and the bypass line, and the second cooler being arranged in parallel with the bypass line; and
    adjusting inlet air temperature downstream of the first charge air cooler by adjusting an amount of inlet air flow through the second cooler and the bypass line; and
    monitoring inlet air temperature and adjusting the amount of inlet air flow through the second cooler and the bypass line as a function of inlet air temperature.

18. The method of reducing condensation in an engine having charge air cooling as set forth in claim 17, wherein inlet air temperature is monitored upstream of the first charge air cooler.

19. The method of reducing condensation in an engine having charge air cooling as set forth in claim 17, wherein inlet air temperature is monitored downstream of the first charge air cooler.

20. The method of reducing condensation in an engine having charge air cooling as set forth in claim 17, wherein air temperature is also monitored upstream of the first charge air cooler.

* * * * *